United States Patent Office 3,405,142
Patented Oct. 8, 1968

3,405,142
17β - HYDROXY - 2 - OXAESTRA - 5(10),9(11)-DIEN - 3 - ONE, 17α - (HYDROCARBON - SUBSTITUTED) DERIVATIVES CORRESPONDING AND ESTERS THEREOF
Raphael Pappo, Skokie, and Christopher J. Jung, Morton Grove, Ill., assignors to G. D. Searle & Co., Chicago, Ill., a corporation of Delaware
No Drawing. Continuation-in-part of application Ser. No. 477,600, Aug. 5, 1965. This application Aug. 17, 1966, Ser. No. 572,904
11 Claims. (Cl. 260—343.2)

ABSTRACT OF THE DISCLOSURE

17β - hydroxy - 2 - oxaestra - 5(10),9(11) - dien-3-one, 17α - (hydrocarbon substituted) derivatives corresponding and esters thereof preparable by rearrangement of the corresponding 4,9(10) - dienes and useful by reason of their antibacterial, antipepsin, anabolic, androgenic and progestational properties.

---

This application is a continuation-in-part of our copending applications Ser. No. 477,600, now abandoned, filed Aug. 5, 1965, Ser. No. 479,318, now abandoned, filed Aug. 12, 1965, Ser. No. 565,707, filed July 18, 1966, and Ser. No. 565,732, filed July 18, 1966.

The present invention is concerned with novel dienoic steroidal lactones wherein the double bonds and carbonyl group are unconjugated and, more particularly, with 17β-hydroxy - 2 - oxaestra - 5(10),9(11) - dien- 3 - one, 17α-(hydrocarbon-substituted) derivatives corresponding and esters thereof. These novel compounds are represented by the following structural formula

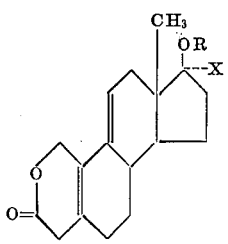

wherein R is hydrogen or a lower alkanoyl radical and X is a lower aliphatic hydrocarbon radical.

The lower alkanoyl radicals denoted by the R term are exemplified by formyl, acetyl, proprionyl, butyryl, valeryl, caproyl, heptanoyl and the branched-chain group isomeric therewith.

Illustrative of the lower aliphatic hydrocarbon radicals encompassed by the X term are lower alkyl radicals such as methyl, ethyl, propyl, butyl, pentyl, hexyl and heptyl, lower alkynyl radicals such as ethynyl, propynyl, butynyl, pentynyl, hexynyl and heptynyl, and lower alkenyl radicals such as vinyl, allyl, crotyl, butenyl, pentenyl, hexenyl, heptenyl, propargyl and methylpropargyl, together with the corresponding isomeric branched-chain groups.

The compounds of the present invention are conveniently manufactured by processes which utilize as starting materials substances of the following structural formula

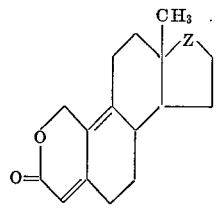

wherein Z is a carbonyl or a

radical, R and X being as hereinbefore defined. Those starting materials together with processes for their manufacture are disclosed in our aforementioned copending applications Ser. Nos. 477,600; 479,318; 565,707 and 565,732. Conversion of those starting materials to the compounds of the present invention is accomplished by reaction with a suitable acidic or alkaline catalyst. Inorganic bases such as sodium hydroxide and potassium hydroxide and organic bases such as pyridine, collidine and triethylamine are especially preferred. A specific example of this process is the reaction of 17β - hydroxy-17α-methyl - 2 oxaestra - 4,9(10) - dien - 3 - one in methanol with aqueous sodium hydroxide to produce 17β - hydroxy-17α-methyl-2-oxaestra-5(10),9(11)-dien-3-one.

An alternate method for manufacture of the instant 17α-alkenyl compounds involves partial reduction of the corresponding 17α-alkynyl derivatives. Typically, 17α-ethynyl - 17β - hydroxy - 2 - oxaestra - 5(10),9(11)-dien-3-one in pyridine is shaken with hydrogen at atmospheric pressure and room temperature in the presence of 5% palladium-on-carbon catalyst to yield 17β - hydroxy-2-oxa-17α-vinylestra-5(10),9(11)-dien-3-one.

The 17-(lower alkanoates) of the present invention can be prepared, alternatively, by acylation of the corresponding 17-hydroxy substance with the appropriate alkanoic acid anhydride or halide, preferably in the presence of a suitable acid acceptor such as pyridine, triethylamine, etc. The reaction of 17β - hydroxy - 2 - oxaestra - 5(10),9(11)-dien-3-one with acetic anhydride and pyridine thus affords 17β-acetoxy-2-oxaestra-5(10),9(11)-dien-3-one.

The compounds of this invention display valuable pharmacological properties. They are antibacterial agents, for example, as is evidenced by their ability to inhibit the growth of such organisms as *Diplococcus pneumoniae*. They possess also antipepsin activity in view of their ability to inhibit the proteolytic action of that enzyme. In addition, these compounds are hormonal agents in consequence of their anabolic, androgenic and progestational properties.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.) and quantities of materials in parts by weight unless otherwise noted.

EXAMPLE 1

Method A

To a solution of 16.36 parts of 17β-hydroxy-2-oxaestra-4,9(10)-dien-3-one in 8.8 parts of methanol is added 10 parts by volume of 50% aqueous sodium hydroxide, and the resulting mixture is kept at room temperature, in a nitrogen atmosphere, for about 16 hours. At the end of that reaction period 2.5 parts of potassium bicarbonate is added, and that alkaline mixture is washed with chloroform. The aqueous layer is separated, then made acidic by the addition of dilute hydrochloric acid. Extraction of that acidic mixture with chloroform affords an organic solution, which is kept at room temperature for about 30 minutes, then is washed successively with aqueous potassium bicarbonate and water. Drying over anhydrous sodium sulfate followed by evaporation of the solvent under reduced pressure affords the crude product, which is recrystallized from benzene to yield 17β-hydroxy-2-oxaestra-5(10),9(11)-dien-3-one, melting at about 151–159°. It displays an ultraviolet absorption maximum at about 239 millimicrons with a molecular extinction coefficient of about 17,000.

Method B

A solution of one part 17β-hydroxy-2-oxaestra-4,9(10)-dien-3-one in 50 parts of pyridine containing 25 parts of acetic acid is heated at the reflux temperature, under nitrogen, for about 16 hours. At the end of that time, the solvents are removed by distillation under reduced pressure. To the residual material there is then added a solution of one part of potassium carbonate in 25 parts of water containing 25 parts of methanol, and that mixture is kept at room temperature for about 48 hours. Chloroform and water are added, and the aqueous layer is separated and acidified with dilute hydrochloric acid. Extraction of the resulting acidic mixture with chloroform affords an organic solution, which is washed successively with dilute sodium hydroxide and water, then dried over anhydrous sodium sulfate and concentrated to dryness under reduced pressure to afford 17β-hydroxy-2-oxaestra-5(10),9(11)-dien-3-one, identical with the product of Method A. This compound is represented by the following structural formula

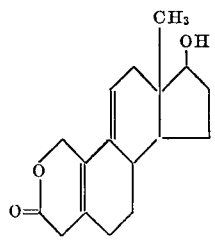

EXAMPLE 2

A mixture of 2.15 parts of 17β-hydroxy-2-oxaestra-5(10),9(11)-dien-3-one, 20 parts of pyridine and 7 parts of acetic anhydride is kept at room temperature for about 16 hours, then is carefully diluted with water in order to decompose the excess reagent. The resulting aqueous mixture is then diluted further with water and is extracted with chloroform. The organic layer is separated, washed successively with dilute hydrochloric acid, dilute aqueous potassium carbonate and water, then dried over anhydrous sodium sulfate and stripped of solvent by distillation under reduced pressure. Crystallization of the resulting residue from ether affords 17β-acetoxy-2-oxaestra-5(10),9(11)-dien-3-one, which displays a melting point at about 144–146°. This compound is represented by the following structural formula

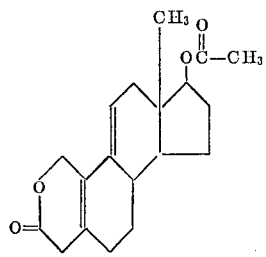

EXAMPLE 3

When an equivalent quantity of propionic anhydride is substituted in the procedure of Example 2, there is obtained 17β-propionoxy-2-oxaestra-5(10),9(11)-dien-3-one.

EXAMPLE 4

To a solution of 15 parts of 17β-hydroxy-17α-methyl-2-oxaestra-4,9(10)-dien-3-one in 84 parts of methanol, under nitrogen, is added 9.3 parts by volume of 50% aqueous sodium hydroxide, and the resulting reaction mixture is stored at room temperature for about 16 hours. At the end of that reaction period, the mixture is diluted with water, and the organic solvent is removed by distillation under reduced pressure. The residual aqueous mixture is diluted further with water, then is acidified by the addition of dilute hydrochloric acid. Extraction of that acidic mixture with chloroform produces an organic solution, which is washed successively with aqueous potassium bicarbonate and water, then is dried over anhydrous sodium sulfate and concentrated to dryness under reduced pressure. Purification of that solid crude product by recrystallization from benzene affords pure 17β-hydroxy-17α-methyl-2-oxaestra-5(10),9(11)-dien-3-one, melting at about 152–154° and displaying an ultraviolet absorption maximum at about 238 millimicrons. It is represented by the following structural formula

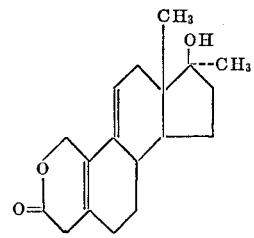

EXAMPLE 5

When an equivalent quantity of 17 α-ethyl-17β-hydroxy-2-oxaestra-4,9(10)-dien-3-one is substituted in the procedure of Example 4, there is produced 17α-ethyl-17β-hydroxy-2-oxaestra-5(10),9(11)-dien-3-one.

EXAMPLE 6

To a solution of 9.5 parts of 17α-ethynyl-17β-hydroxy-2-oxaestra-4,9(10)-dien-3-one in 60 parts of methanol is added 6.4 parts by volume of a 50% aqueous sodium hydroxide solution and the resulting reaction mixture is stored at room temperature in a nitrogen atmosphere for about 16 hours. At the end of that time, water is added, and the organic solvent is removed by distillation under reduced pressure. The pH is adjusted to approximately 8 by the addition of dilute hydrochloric acid and solid carbon dioxide. That aqueous mixture is washed with chloroform, then is acidified with hydrochloric acid. The acidic solution is extracted with chloroform, and the organic layer is separated, washed successively with dilute aqueous potassium bicarbonate and water, then dried over anhydrous sodium sulfate and stripped of solvent under reduced pressure. The resulting residue is purified by recrystallization from benzene to yield 17α-ethynyl-17β-hydroxy-2-oxaestra-5(10),9(11)-dien-3-one, melting at about 162.5–164.5°. It is represented by the following structural formula

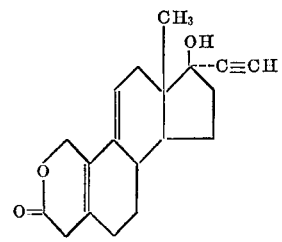

EXAMPLE 7

The substitution of an equivalent quantity of 17β-hydroxy-17α-propynyl-2-oxaestra-4,9(10)-dien-3-one in the procedure of Example 6 results in 17β-hydroxy-17α-propynyl-2-oxaestra-5(10),9(11)-dien-3-one.

EXAMPLE 8

To a solution of 3 parts of 17α-ethynyl-17β-hydroxy-2-oxaestra-5(10),9(11)-dien-3-one in 150 parts of pyridine is added 0.3 part of 5% palladium-on-carbon catalyst, and the resulting mixture is shaken with hydrogen at atmospheric pressure and room temperature until one molecular equivalent of hydrogen has been absorbed. Removal of the catalyst by filtration affords a filtrate, which is evaporated to dryness under reduced pressure. The resulting residue is dissolved in benzene, and that solution is clarified and decolorized by stirring with aluminum silicate. Partial concentration of the benzene solution results in crystallization of the product which is isolated by filtration and dried to afford, as the benzene solvate, 17β-hydroxy - 2 - oxa - 17α - vinylestra - 5(10),9(11) - dien - 3-one, melting at about 82–89°. This compound is represented by the following structural formula

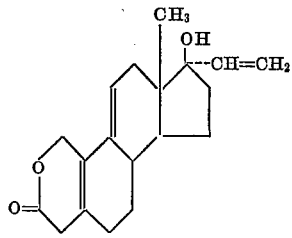

EXAMPLE 9

The substitution of an equivalent quantity of 17β-hydroxy-17α-propynyl-2-oxaestra-5(10),9(11)-dien-3-one in the procedure of Example 8 results in 17β-hydroxy-2-oxa-17α-propenylestra-5(10),9(11)-dien-3-one.

What is claimed is:
1. A compound of the formula

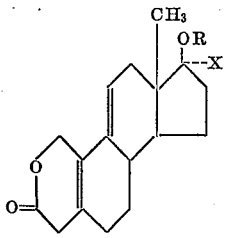

wherein X is a lower aliphatic hydrocarbon radical and R is selected from the group consisting of hydrogen and a lower alkanoyl radical.

2. As in claim 1, a compound of the formula

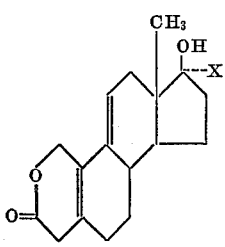

wherein X is a lower aliphatic hydrocarbon radical.

3. As in claim 1, the compound which is 17β-hydroxy-2-oxaestra-5(10),9(11)-dien-3-one.

4. As in claim 1, a compound of the formula

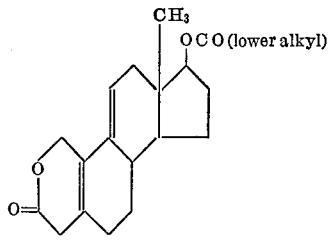

5. As in claim 1, the compound which is 17β-acetoxy-2-oxaestra-5(10),9(11)-dien-3-one.

6. As in claim 1, a compound of the formula

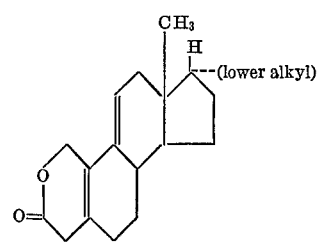

7. As in claim 1, the compound which is 17β-hydroxy-17α-methyl-2-oxaestra-5(10),9(11)-dien-3-one.

8. As in claim 1, a compound of the formula

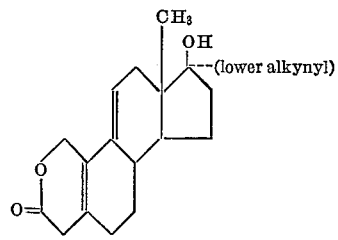

9. As in claim 1, the compound which is 17α-ethynyl-17β-hydroxy-2-oxaestra-5(10),9(11)-dien-3-one.

10. As in claim 1, a compound of the formula

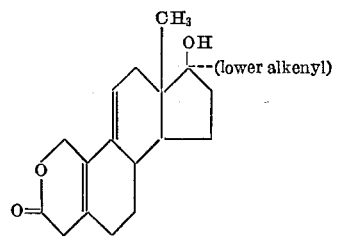

11. As in claim 1, the compound which is 17β-hydroxy-17α-vinyl-2-oxaestra-5(10),9(11)-dien-3-one.

References Cited

UNITED STATES PATENTS 3,280,149   10/1966   Jung et al. _____ 260—343.2

JAMES A. PATTEN, *Primary Examiner.*

UNITED STATES PATENT OFFICE
CERTIFICATE OF CORRECTION

Patent No. 3,405,142                                October 8, 1968

Raphael Pappo et al.

It is certified that error appears in the above identified patent and that said Letters Patent are hereby corrected as shown below:

Column 6, lines 18 to 28, the upper right-hand portion of the formula should appear as shown below:

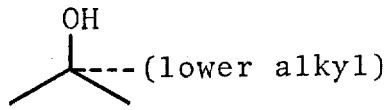

Signed and sealed this 3rd day of March 1970.

(SEAL)
Attest:

Edward M. Fletcher, Jr.                    WILLIAM E. SCHUYLER, JR.
Attesting Officer                                Commissioner of Patents